July 13, 1971 A. MARZOCCHI ET AL 3,592,709
DRIVE BELT CONSTRUCTION
Original Filed June 27, 1967 2 Sheets-Sheet 1
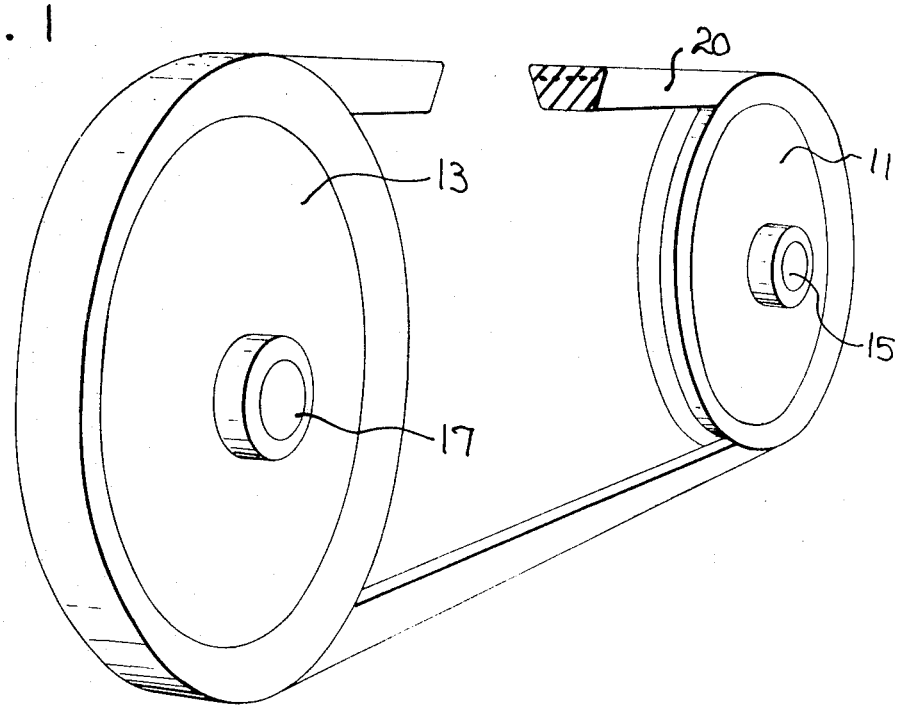
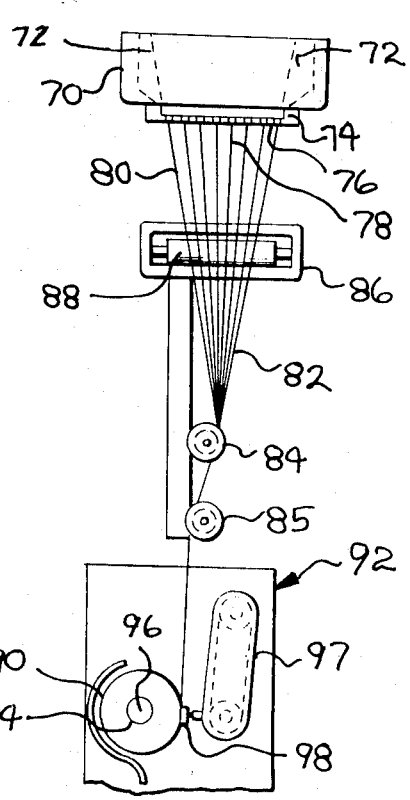
INVENTORS
ALFRED MARZOCCHI
ALBERT J. GARBIN
BY
Staelin & Overman
ATTORNEYS

INVENTORS
ALFRED MARZOCCHI
ALBERT J. GARBIN
BY
ATTORNEYS

# United States Patent Office 3,592,709
Patented July 13, 1971

3,592,709
DRIVE BELT CONSTRUCTION
Alfred Marzocchi and Albert J. Garbin, Cumberland, R.I., assignors to Owens-Corning Fiberglas Corporation
Original application June 27, 1967, Ser. No. 649,164, now Patent No. 3,469,512, dated Sept. 30, 1969. Divided and this application Feb. 24, 1969, Ser. No. 839,098
Int. Cl. B29h 7/22
U.S. Cl. 156—142                                   4 Claims

ABSTRACT OF THE DISCLOSURE

A power belt manufacturing method comprising the steps of widing a first rubber layer about a collapsible mandrel, a second stiffer layer about the first layer, winding a length of glass fibers in gathered-together array spirally about the second layer, the array being of flat to oval cross-sectional configuration, repeated winds of the cord being adjacent, winding another layer of stock about the assembly, followed by a cutting of the assembly, a collapsing of the mandrel, a removal of the elements and a vulcanization of the elements to form the power belt.

---

This is a division of co-pending application Ser. No. 649,164, filed June 27, 1967, now U.S. Pat. No. 3,469,512 issued Sept. 30, 1969.

The present invention relates to endless belts of the industrial drive type. Fractional horsepower V-belts represent the most common example of these belts. Other examples include flat belts, conveyor belts, timing belts, etc.

More particularly, the present invention relates to drive belts of improved construction featuring an interiorally disposd reinforcement element of novel configuration and composition together with, in certain instances, a co-operating auxiliary support member.

Industrial drive belts, of course, are fabricated of a vulcanizable elastomeric stock which is cured in a mold. Since in most applications they are running between a pair of spaced sheaves or pulleys, one of which is driven, they are under considerable tension during the transmission of the rotative motion to the opposite pulley. Unless the belt is interiorally reinforced, the rubber will stretch due to the natural large elongation characteristic of the rubber, whereupon the drive belt exhibits slippage and loss of efficiency in transmission.

Industrial drive belts, e.g., V-belts, have in the past been reinforced in a variety of ways. One manner of reinforcing the drive belt consists of locating a layer of a woven fabric interiorally within the belt during the construction or fabrication thereof. In fabricating V-belts, a layer of rubber stock is first applied about a collapsible mandrel. Then a layer of the reinformcing fabric is wrapped about the layer of stock, followed by a final layer of the rubber stock. The so-formed band is then cut by knives into a plurality of hoop members which are removed from the mandrel when collapsed, located in core molds and subjected to heat and pressure to vulcanize them to the cured state. In place of the fabric, it has been common practice to feed onto the first layer of rubber a continuous length of textile cord as the mandrel is rotated, slowly moving the cord, while under tension, either from left to right or right to left so that the cord is in touching or slighly spaced relationship with the succeeding wind of cord. Rubber solvents are applied to secure the cord securely and the cord is frequently desirably impregnated with a compatible rubber impregnant or solvent to aid in the securement of the first layer, the spirally wrapped textile cord and the last layer of rubber. Fibers of cotton, rayon, polyester (Dacron and Kodel), nylon and a variety of other organic textiles have been used as the reinforcement cord in the manufacture of fractional horsepower belts as well as, as indicated, other industrial drive belts.

More recently, fiber glass has been suggested as a candidate cord for incorporation into V-belt constructions. Glass is suggested by reason of several very desirable properties. Principally among these are a tensile strength of the bare fiber which is in the neighborhood of 500,000 pounds per square inch. Also, glass has an extremely high modulus in the neighborhood of 322 grams per denier and a low elongation in the neighborhood of a maximum of 3%; additionally, low moisture absorptivity in the neighborhood of zero and an essentially 100% elastic recovery. These properties suggest that a belt containing a glass reinforcement would be of uniform size as well as embody resistance to moisture and heat.

The organic cord reinforced belts are subject to considerable elongation under load and, in fact, are known to elongate when hanging on the hook under inventory conditions. By way of further explanation, organic cord reinforced belts are known to experience considerable elongation under load, requiring idler pulleys, retentioning and, as well, resizing after extended inventory storage conditions.

While glass possesses what appear to be desirable attributes, the incorporation of glass successfully into rubber as a reinforcement presents a number of difficulties. In the first place, the compatibility of the glass with rubber and the adhesiveness of glass to rubber is not as desirable as with the organic fibers. In the first place, it is inorganic rather than organic as the others. Secondly, it has a completely smooth and impervious surface as compared to most textiles. These problems have been largely overcome through the development of sizes, coatings and combination size and impregnation coatings which provide a high degree of adhesion of the glass to the rubber matrix. These adhesion and compatibility sizes and coatings represent inventions which are embodied in a number of patent applications assigned to the same assignee as the present application. Included among these is Ser. No. 218,723, filed Aug. 22, 1962, now U.S. Pat. No. 3,252,278.

Over and above the adhesion difficulty, of course, it must be appreciated that glass possesses a number of properties or characteristics which are markedly different in numerical value from those possessed by the conventional reinforcing organic materials. By way of example, in stiffness expressed in grams per denier, glass has a value of 322 while cotton has a value of 60; Dacron (a polyester) a value of 21; viscose rayon a value of 0.2; nylon a value ranging from 18 to 23; and Orlon (an acrylic) a value of 10. These values demonstrate a difference factor ranging from 5 to 1000. In breaking elongation expressed as a percent, glass has a value of 3–4; Dacron (a polyester) has a value of 19–25; viscose rayon has a value ranging from 15–30; nylon a value of 25–40; and Orlon (an acrylic) a value of 25. These latter demonstrate a difference factor in the order of magnitude of from about 4 to 10. In average toughness (calculated as —elongation×load at failure divided by 2), glass has a value of 0.07 pound-inch; Dacron (a polyester) a value of 0.5 pound-inch; viscose rayon a value of 0.19 pound-inch; nylon a value of 0.75 pound-inch; and Orlon (an acrylic) a value of 0.4 pound-inch. Here, the difference factor ranges from 2 to 10. By way of further illustration, glass has a specific gravity of 2.54. In contrast, Dacron (a polyester) has a specific gravity of 1.38; viscose rayon 1.46; nylon 1.14; and Orlon (an acrylic 1.14. Thus, it can be seen that glass is almost twice as heavy as the conventional organic fibers.

Therefore, a consideration of how to incorporate glass into rubber as a reinforcement for industrial drive belts involves not a matter of substituting glass fiber for the organic fiber, but rather presents a number of problems, several of which are believed solved by the present invention.

Initially, it is believed that to efficiently and improvedly reinforce rubber, the glass must be converted into a particular form or configuration as will accommodate the properties that differ from the conventional organics and, as well, permit full utilization of the markedly superior properties such as high tensile, high modulus and high elastic recovery. Secondly, it is believed that the geometry of the glass/rubber system, that is, the spatial arrangement of the glass reinforcement in the rubber matrix, must be carefully defined in order to assist in the accomplishment of the above stated ends.

With the foregoing introduction, it may be stated that it is a principal object of the present invention to provide a general system for the efficient, and we might say optimum, utilization of glass as a reinforcement in an annular belt of the industrial drive type.

It is a particular object of the present invention to provide a novel reinforcement construction featuring an arrangement for spatially locating an endless reinforcement interiorally within the industrial belt so as to achieve the optimum in ultimate strength and, as well, the ultimate in life expectancy under load conditions.

It is still another object of the present invention to provide a particular arrangement of glass assemblies of novel character as to insure their disposition and the retention of their particular disposition within the V-belt or drive belt viewed in section.

It is a specific object of the present invention to provide a definite geometry of reinforcement placement in terms of other elements of the reinforcement and in terms of overall location within the industrial belt.

It is additionally an object of the present invention to provide a particularly utilitarian arrangement of glass elements gathered together in a fashion as to be particularly useful in this application as a reinforcement of an industrial drive belt.

It is also an object of the present invention to provide a unique method of incorporating the glass reinforcement of particular configuration into the V-belt, utilizing otherwise generally conventional V-belt manufacturing techniques.

It is a particular object of the present invention to provide a modified method of producing industrial drive belts specifically designed to yield the optimum in performance and life expectancy, having in mind the particular glass reinforcement assembly of the present invention.

It is another object of the present invention to provide a belt construction and, as well, a method of manufacture; the construction being characterized by the uniformity of load distribution as between the individual glass elements incorporated as a reinforcement in the V-belt construction.

It is still another object of the present invention to provide a belt construction which, by reason of the geometry and spatial attitude of the reinforcement therein, takes optimum advantage of the desirable strength properties of glass referred to hereinabove.

It is a particular object of the present invention to provide a belt which is resistant to elongation under either load or static conditions.

The foregoing, as well as other objects of the present invention, will become apparent to those skilled in the art from the following detailed description and the included examples taken in conjunction with the annexed sheets of drawings on which there are presented, for purposes of illustration only, several embodiments of the present invention.

In the drawings:

FIG. 1 is a perspective view of an annular V-belt, with a section broken away, mounted on a pair of spaced sheaves;

FIG. 3 is a schematic elevation view of a forming operation for a strand or roving featuring a large multiplicity of individual glass fibers;

Figure 4:
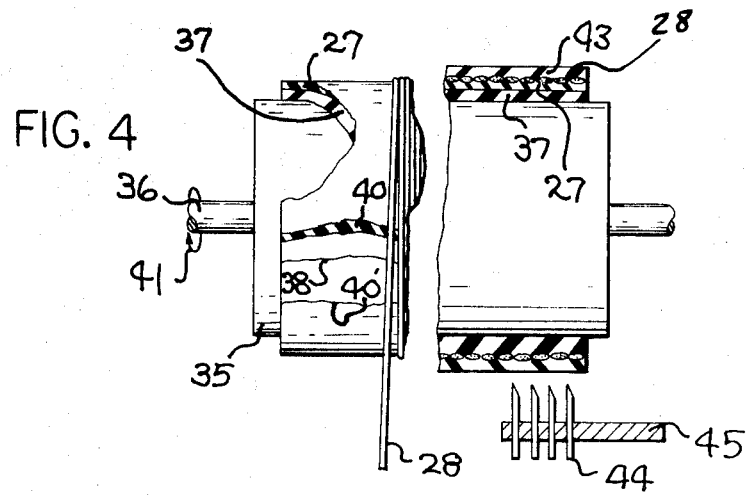
FIG. 4 is a side elevation view of a V-belt fabrication operation in two separate stages of completion.

In accordance with one embodiment of the present invention, the construction envisioned includes an endless belt formed of rubber or similar elastomeric material; the belt icluding continuous spaced inner and outer surfaces connected by side walls, an interiorally disposed band extending longitudinally within the belt and in an annular plane located closer to the outer surface of the belt than to the inner surface; said band being formed of a compatible rubber-like material slightly stiffer than the remainder of the belt body and a linear multi-element reinforcement member extending longitudinally within said belt to define a continuous spiral proceeding about said band on the side thereof closest to the outer surface in repeating winds from one side wall to the other side wall of said body.

In accordance with a further embodiment of the present invention, the belt construction of the present invention envisions an anular or edless belt which, viewed in section, discloses a lower segment formed of rubber, or like material, and a continuous reinforcement member extending longitudinally and in spiral fashion within the annular belt; said member having a generally flat to generally elongatedly oval configuration and being composed of a large plurality of individual glass fibers gathered together in generally non-twisted array; said oval configuration having its major diameter laterally of the V-belt cross-section, or, stated conversely, the minor diameter of the oval is normal to the bottom and top surface of the annular belt.

The reinforcement member in the form of the gathered together non-twisted array of glass fibers is ideally utilized in conjunction with an interiorally disposed band situated just beneath but contacting the spiral winding of the non-twisted glass fibers. This band arrangement, being stiffer than the belt proper, provides a support, as it were, for the spiral winding of untwisted fiber yarns whereby the tension or load carried by the belt is distributed evenly to each of the fibers in the untwisted yarn or gathering. Further, the stiffer belt serves to fix the location of the spiral in a uniform manner in terms of its relationship with the inner and outer surface of the belt. Accordingly, the reinforcement can be reliably located in various dimensional positions to meet the particular service requirements of the belt concerned.

The interiorally disposed band also proves of utility with reinforcement members formed of other than the untwisted gathering or array of glass fibers. Thus, the band establishes a platform or support for other conventional type textile cord reinforcements. The band, in fact, functions to overcome certain shortcomings in glass fiber cords formed of various combinations of yarns and strands gathered together with the conventional twist technique. Thus, it has been observed in V-belts that cord reinforcements featuring twist in the gathering and assembly operation tend to exhibit an uneven distribution of the load to which the belt is subjected. This is believed due to the fact that a given fiber or strand will proceed in a spiral path longitudinally of the cord due to the twist employed in the gathering together. Naturally, therefore, in a spirally disposed glass cord within a belt, a fiber will extend unevenly, first on one side of the cord, then on the other. A fiber or strand on the outside part of the cord will thus be exposed to greater tensile forces and will translate this to an underlying strand or fiber leading to "break through" and usually to ultimate failure. Cords in their spiral disposition in the belt also exhibit the phenomenon of "cross over."

Most ideally, in accordance with this invention, there is employed as a belt reinforcement a strand or a yarn composed of a large multiplicity, say upwards of 750 individual filaments and even up to 2,000 filaments, drawn from a single platinum bushing and attenuated into fibers in gathered, contiguous untwisted array. Normally, in drawing a number of filaments from a heated platinum bushing and then attenuating them into fibers, a slight amount of twist is employed to assist in lending strand integrity to the aggregate. Additionally, of course, a gathering adhesive size or starch is employed. Most desirably, we form a continuous untwisted strand formed of from about 750 to about 2,000 individual filaments, or higher, drawn simultaneously from a bushing and attenuated into individual fibers having a diameter of about 0.00035 inch. These are sprayed most desirably with a compatible size in accordance with the teachings of the inventions embodied in the aforecited U.S. patent applications assigned to the same assignee as the present application. In drawing 2,000 filaments from the bushing, the large number permits the attenuation to proceed at a comparatively slow linear speed of about 4,5000 per minute with a very slow traverse during the package formation. Apparatus and methods for forming packages of continuous strand are disclosed in more detail in U.S. application Ser. No. 455,753 now Pat. 3,367,587, filed May 14, 1965; said application being assigned to the same assignee as the present invention. The strand or roving composed of the 2,000 filaments is best described as a gathered-together array of individual fibers in adjacent or contiguous, generally nontwisted, relationship; each fiber possessing a relatively uniform tension throughout the wound package of continuous roving.

Additional disclosure in the invention will now be set forth in more detail and reference is herein made to FIG. 1 wherein there is disclosed a pair of spaced sheaves or pulleys 11 and 13 respectively mounted on shafts 15 and 17; one of which is driven by a power source, not shown. The annular grooves of the pulley have mounted therein an annular belt 20 of the present invention, which is shown greatly enlarged in a sectional view in FIG. 2. The belt, as therein shown, is composed of a bottom annular surface 21 and a spaced upper annular surface 22; the latter in parallel relationship and joined at their marginal edges by side walls 23 and 24 in downwardly converging relationship in the direction of the bottom wall 21. The belt in section defines a trapezoid; the inclined sides of which suggest the common name V-velt. The V-belt further comprises a central major portion 25 composed of rubber or a suitable syntehtic such as GRS or a blend thereof, as is well known in the technology of industrial drive belts. In accordance with the present invention, the V-belt includes a narrow band 27 which extends from side wall 23 to side wall 24 and in parallel relationship with the bottom surface 21 and the top surface 22, but most desirably spaced somewhat closer to the upper surface 22. The band 27 is likewise formed of an elastomeric substance which is preferably compatible with the principal body portion 25. The band, however desirably features a toughness or modulus which is somewhat greater than the composition comprising the major portion 25 of the belt. Above the band 27 is located a continuous length of the reinforcement member 28 in accordance with the present invention. The reinforcement member 28 is a gathered-together assembly of up to 2,000 individual filaments of glass. The indiivdual filaments, as indicated earlier herein, are gathered together without imparting thereto any or at least no appreciable twist.

The fibers, accordingly, within the gathered configuration 28, are continuous and essentially in uniform parallel relationship with fibers both in the same assembly as well as with fibers in an adjacent assembly 28a representing one turn further in the spiral arrangement of the reinforcement throughout the belt proper. The fibers generally are characterized by a substantially continuous or uniform degree of tension when subjected to load by reason of the balanced and uniform untwisted relationship as between one fiber and the other in the given assembly 28. A somewhat smaller section of rubber 29 is located above and about the spiral array of strands or yarns 28.

A layer of inexpensive friction-coated textiled cloth 30 is wrapped about the construction so far described to complete the V-belt construction. The cloth wrap serves to protect the outer surfaces of the belt from friction and abrasion occurring through contact with the matching surfaces of the sheave or pulley.

Figure 2:
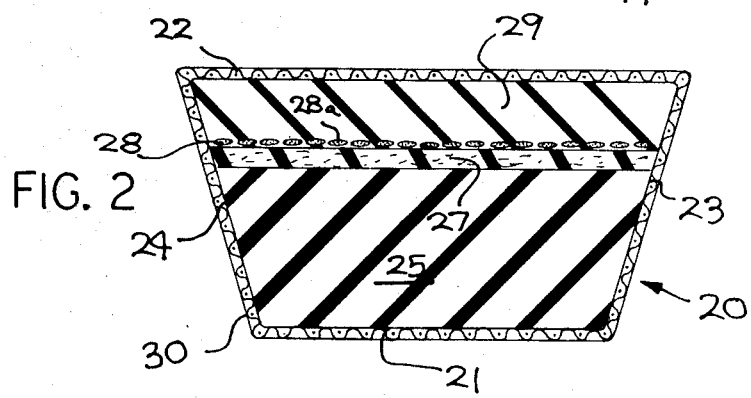
FIG. 2 is an enlarged view of the V-belt as broken away in section in FIG. 1.

The strand or roving 28, as can be seen by reference to FIG. 2, has a sectional configuration, in aggregate, defining a generally flat to oval contour. This is in contrast with the normally employed cord reinforcement constructions which have a generally circular configuration in section. The total array of side-by-side turns or wraps of the continuous strand or roving thus defines all across the belt a relatively uniform spacing of individual fibers which occupy a minimal amount of space in the vertical direction taken from the top wall 22 to the bottom wall 21. A belt featuring this construction exhibits longer life and greater strength characteristics, it is believed, by reason of the dynamic stability imparted to the overall structure by the very selective location of the relatively heavy strands or rovings composed of the great multiplicity of individual fibers; namely, from 750 up to 2,000, and above. The belt of the present invention as disclosed in FIG. 2 is also believed novel by reason of the incorporation therein of the thin band of somewhat higher modulus compatible stock. The thin band is believed to impart or to lend to the construction somewhat the function of a platform upon which reinforcing cords of whatever the composition may rest in supported fashion, thereby precluding, or at least substantially reducing, the shifting of the cords or, more preferably, the multifilament strand or rovings embodying the essentially parallel filaments that might otherwise and usually is otherwise observed prior to or during curing. Shifting movement of the cords within the V-belts prior to or during cure leads to dynamic instability. Additionally, dislocation of the reinforcement adversely affects the proper load distribution and reduces efficient stress transfer from cord to cord.

Most preferably we have observed, the cords, and particularly the parallel filament strand or roving reinforcement members of the present invention, should reside in closely spaced adjacent relationship wherein they fall in the same annular plane uniformly spaced from the upper or the lower surface of the belt. A spacing of about 20 ends per inch is preferred. This phenomena of dynamic instability is accentuated through the use of glass considering the relative specific gravity thereabove as compared to other candidate cord reinforcements. With this in mind and considering the centrifugal forces to which the belt is subjected, it may be desirable under certain circumstances to employ the belt on the other side of the array of glass strand reinforcement members than that shown in FIG. 2. In other words, the band or platform would be located between the top wall 22 and contiguous to the array of strands or rovings. Under certain conditions, it is even most desirable to employ two bands or plaftorm members 27, one on either side of the array of generally flat to oval configurated spiral wrapping of multi-filament glass reinforecement.

Referring now more specifically to FIG. 3, there is disclosed an arrangement for drawing the multi-filament untwisted strands from a single feeder 70 containing a supply of heat softened glass. The feeder may be connected with a forehearth (not shown) supplied with glass from a furnace or the glass may be reduced to heat softened condition in a melter or other means connected with the feeder. The feeder is provided with terminal lugs 72 adapted to be connected with a circuit of electrical energy for supplying heat to the material and the receptacle to maintain the material at the proper temperature and viscosity. The floor 74 of the feeder is equipped with a large number of depending tips 76; the tips having orifices therein for flowing streams 78 of the glass with other filament forming materials from the feeder. The streams are attenuated into individual continuous filaments 80. A roving 82 is formed by converging a large number of the filaments 80, attenuated directly from the glass streams 78, into untwisted bundled relationship by a gathering shoe 84. The roving comprises about 1,000 individual filaments. A second shoe or guide 85 for the roving may be provided. Under some circumstances, it may be desirable to apply lubricants or coating materials to the filaments. For this purpose, an applicator housing 86 supports an applicator 88, which may be an endless belt partially immersed in coating material contained in the housing for transferring the coating material to the filaments through a wiping action of the filaments engaging a film of coating material on the applicator belt 88. The roving 82 is collected in a package 90 by a winding apparatus 92; the roving being wound onto a collector such as a tube or sleeve 94, telescoped onto a rotatable collet 96. The collet is rotated by an electrically energizable motor (not shown). The speed of the motor, in accordance with the invention described in the copending application, is varied to reduce the rotational speed of the winding collet as the package of roving 95 increases in size so as to remain substantially constant with respect to the lineal speed of the filaments to ultimately make filaments of uniform size. The roving is wound on the package utilizing a guide means 97 including a head 98 which contacts the package and operates as a sensor for detecting the increasing size of the roving on the spool. It also traverses in a manner more specifically described in application Ser. No. 455,753, now Pat. 3,367,587, filed May 4, 1965, assigned to the same assignee as the present invention.

The reinforcing untwisted multi-filament assembly of glass fiber for use in the present invention may be formed by assembling, with practically no twist, ten separate 204 filament strands which are drawn from separate 204 orifice bushings. Such an assembly will, in section, have an oval configuration with the greatest dimension laterally of the belt width when wound onto the forming mandrel, e.g., described hereinafter.

Referring now to FIG. 4 and particularly the left-hand segment, there is disclosed a typical apparatus setup for fabricating the V-belt by laying up the rubber stock and reinforcement material in the unvulcanized state. The reference numeral 35 identifies a collapsible mandrel mounted on a rotatable shaft 36 driven by a suitable electrically energizable motor (not shown). A sheet of rubber 37 of relatively uniform thickness of about ⅜″–½″ is wrapped around the outer surface of the mandrel; the mating chamfered edges being overlapped and knit together, as at 38. A sheet of a stiffer stock 27 is applied coextensive with the rubber stock 37. As shown in FIG. 4, a section of stock layer 27 has been broken away on the lines 40–40′ in order to disclose the knitting together of the facing edges 38 of bottom sheet 37.

The shaft is then rotated slowly in the direction indicated by the arrow 41 and a continuous length 28 of a strand or yarn composed of about 2,000 individual continuous filaments of glass gathered together without twist is fed on top of the somewhat stiffer stock, starting at one lateral edge. As the mandrel or roller 35 rotates, the strand of untwisted glass fibers wraps itself, under tension, about the periphery in the manner indicated to describe a continuous spiral in which the adjacent and succeeding courses are in almost contacting relationship with each other.

The right-hand segment of FIG. 4 discloses several final steps in the fabrication of the "green" V-belt assembly. The continuous spiral of fiber glass yarn is overcoated with a final layer 43 or sheet of uncured rubber generally coextensive with the previously applied layers and, of course, coextensive with the spirally wound strand. As can be seen, the strand 28 of continuous filaments, as viewed in section, is of relatively flat to oval configuration laterally. Both before the application of the continuous yarn 28 and after its application, a small amount of an adhesive or rubber solvent is applied to assist in the binding together of the lower layer 37, the somewhat stiffer stock layer 27, the spiral strand 28 and the upper layer 43. With the several components knitted together, aided by the adhesive or the rubber solvent, knives 44 mounted in a suitable holder 45 are moved thereagainst to cut the assembly into a plurality of ring or hoop-shaped members; one of which is shown in section form in FIG. 5 and identified by the reference numeral 20.

Figure 5:
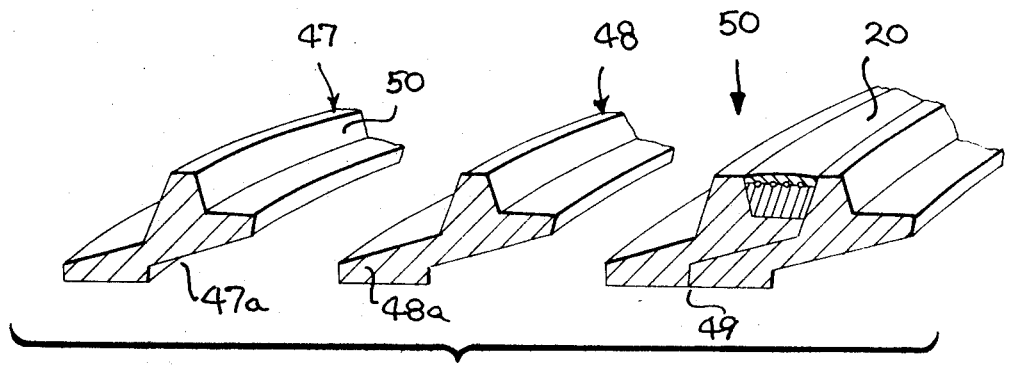
FIG. 5 is a broken-away perspective view showing segments of mold rings in spaced relationship and also embracing a V-belt blank in position for autoclave or steam vulcanization cure of the green or blank V-belt construction upon removal from the assembly operation illustrated in FIG. 4.

FIG. 5 is a diagrammatic view of a plurality of segments 47 and 48 of a ring mold. The ring molds are identically shaped and include a mating segment 48a in the nature of a flange and a recessed portion 47a which fit together, as shown by the reference numeral 49, and in the mating position define a cavity 50 for reception of the ring or hoop-shaped unvulcanized member 46. A plurality of these ring members are sequentially assembled together with uncured ring-shaped members 20 whereupon the ring mold is secured together and wrapped with a wet nylon cloth for insertion in an autoclave where saturated steam pressure effects cure or vulcanization of the individual ring-shaped members. Upon completion, the ring mold is taken apart and the members 20 removed in the form of finished vulcanized V-belts.

As has been alluded to, the belt includes the interiorly disposed band 27 and wound thereabout the continuous strand 28, adjacent wraps or winds of which lie in almost contacting relationship.

The band 27 is formed of a rubber stock which is vulcanizably compatible with the stock forming the lower segment 25 and upper segment 29 of the belt body proper. The characteristic of somewhat greater stiffness or modulus can be achieved by adjustment in the filler system. Thus, a proportion or an amount of textile fibers, such as cotton, rayon or nylon, can be introduced to a portion of stock and mixed intimately therewith on a mill to distribute it uniformly through the stock. The stock with this fiber loading will exhibit a stiffness and toughness or modulus which is somewhat greater than the remainder of the belt body and consequently permit it to function in the manner described; namely, as a support or platform for the continuous spiral-wound strand reinforcement. Generally, the bands should measure about ¹⁄₆₄ inch or a little larger in thickness.

Most perferably, it is preferred that the support or platform band be formed of a compatible rubber stock containing, instead of an ordinary textile fiber, a combination of chopped glass fibers and glass cords. This can be done by adding to the rubber stock while on the mill an amount, say in the neighborhood of 5 parts per hundred of rubber, of chopped cords. By a chopped cord, we mean a multi-filament assembly of glass fibers. A typical glass cord is identified, for example, as a "10/3" cord. Other examples include a "1/3" cord, a "2/4" cord, a "4/3" cord. A "10/3" cord construction is accomplished in the following way. Ten strands, each composed of 204 filaments, are combined together with a given number of twists per inch. This assembly, which may be referred to as a 10-strand yarn, is then combined with two identical 10-strand yarns (making a total of three), again incorporating in the assembly a certain or given number of twists per inch. Usually, the twists per inch in the second assembly is the opposite of that in forming the 10-strand yarn in order to yield a balanced cord structure.

From the foregoing, it can be seen that various cord assemblies can be formed of various combinations and permutations of strands to form a yarn and various pluralities of yarns to form the cord. Similarly, the individual strand may be formed, depending on the bushing, of a different and varying number of individual filaments per strand. The strand is generally passed through a spray of a sizing composition which serves the purpose of holding the multi-element strand assembly with a certain degree of integrity. Having in mind that the ultimate cord is to be chopped and embedded or introduced into an elastomeric rubber stock, it is desirable to employ a size which will favor this ultimate application.

The following is an illustrative example of a size for this purpose:

EXAMPLE I 0.5–2.0 percent by weight gamma-aminopropyltriethoxy silane
0.3–0.6 percent by weight glycerine
Remainder water It is also desirable to impregnate the cords with an appropriate impregnant in order to achieve the optimum in ultimate adhesion between the chopped cord and the elastomer. A typical formulation of a suitable impregnant bath is as follows:

EXAMPLE II 60 parts by weight Lotol 5440—U.S. Rubber Company Lotol 5440 is a 38% dispersed solids system including a butadiene-styrene-vinyl pyridine terpolymer latex, a butadiene styrene latex and a resorcinol-formaldehyde resin.
39 parts by weight water The chopped cord is introduced into the elastomeric or rubber stock in two steps. Thus, 5–10 parts per hundred of rubber of the chopped cord is introduced to the stock material while on a conventional rubber mill. The stock can be continued to be worked and the cord will break down to form discrete fibers. As a consequence, the cord loses its identity as a multi-filament assembly. In the second stage, from 10–50 (perferably about 15 to 25) parts per hundred of rubber of chopped cord is added to the stock in the mill, but the mixing is continued for only several passes sufficient to distirbute the chopped cords measuring, for example, for ¼ to 1 inch in length uniformly through the rubber stock but insufficient to cause any material degradation or reduction of the cord from its multi-element but integral form. This material can then be sheeted off or calendered to the desired thickness and width as to form the band for incorporation into the V-belt assembly operation as described hereinbefore. The stock containing both the proportion of the glass in fiber form and the glass in chopped cord form is preferred in forming the band 27 (FIGS. 2 and 4) by reason of the fact that the amount of the glass fiber and cord reinforcement can be maintained at relatively high levels as compared to the conventional textiles without detracting from the elasticity and resiliency of the basic rubber formulation. Conventionally, textile fiber loaded stocks, in addition to lending a reinforcement function, at the same time result in a somewhat deader or less resilient stock by reason of the fact that the plasticizing oils naturally inherent in the rubber stock, that is, the low molecular weight portions, or the added plasticizers, are attracted and absorbed by the textile fibers, leaving the basic rubber matrix deficient in these substances. Glass fibers and cords, on the other hand, do not have this propensity and, as a consequence, they can be introduced at higher levels as indicated without exhibiting this phenomenon.

The band 27 serving as the platform member is desirably so composed that the fibers therein, be they on the one hand cotton, nylon, rayon, or on the other hand chopped glass fibers and cords, are predominantly oriented transverse to the longitudinal axis of the belt. A belt including this constructional feature is characterized by a greater resistance to compression particularly in the crosswise direction. Such a construction also permits formulation of the stock to a greater degree of resiliency than could otherwise be accomplished. These two features in combination cooperate to provide a belt characterized by lower hysteresis and lower modulus of elasticity.

A typical rubber stock useful in forming the principal body portion of the V-belt has the following recipe:

EXAMPLE III

| | Parts |
|---|---|
| #1 Ribbed smoked sheet | 40 |
| SBR 1500 | 60 |
| Zinc oxide | 5 |
| Stearic acid | 2 |
| AgeRite Resin D | 1 |
| Thermoflex A | 1.5 |
| Altax | 1.5 |
| Ledate | 0.2 |
| Circosol 2XH | 10 |
| SRF Black | 75 |
| FEF Black | 20 |
| HAF Black | 20 |
| Sulfur | 2 |
| | 238.2 |

EXAMPLE IV

A series of V-belts featuring a construction as shown in FIG. 2 were fabricated in the manner as described hereinbefore. The rubber body portion was formed of a rubber composition having the recipe of Example III. The support platform 27 was formed of the same rubber, but containing 15% by weight of ¼ inch chopped "3/0" cords. The filaments making up the cords were sized during formation with a size according to Example I and the strands making up the cord were impregnated with the impregnant of Example II prior to chopping. The continuous spiral cord 28 was composed of a 2,000 glass filament assembly; the individual filaments of which were sized and the assembly impregnated respectively with the materials of Example I and Example II. The spacing of the spiral wrap 28 measured 22 ends per inch. The belts measured about 39 inches in circumference and about ½ inch in width. The belts, after vulcanization and cooling to room temperature, were tested, e.g., running to failure, on a pair of 2½" O.D. pulley under a load of 90 pounds at 3600 revolutions per minute. The belts ran an average of 234.1 hours with acceptable coefficient of variation. A series of control belts featuring a conventional rayon cord reinforcement, when tested under the same conditions, revealed an average failure at 130 hours or less.

From the above, it can be seen that drive belts employing the constructional features of the present invention are possessed of long life under load conditions. Particularly unique features of the present invention include (1) the provision for the interiorly located belt serving as a support platform for cord reinforcement preventing or precluding cord displacement and aiding dynamic stability and (2) the provision for a multifilament glass reinforcement assembly of generally flat to oval cross-sectional configuration serving to distribute the load quite uniformly to all the reinforcement components.

The foregoing disclosure, including description and drawings, will be suggestive to one skilled in the art of alternative and equivalent variations and substitutions of elements as well as equivalent rearrangements. Accordingly, all such variations and substitutions are to be considered as included within the spirit and scope of the present invention unless clearly violative of the language of the appended claims.

We claim:
1. The method of producing a power transmission belt which comprises:
   winding a first layer of vulcanizable stock about a collapsible mandrel,
   winding a relatively thin band of vulcanizable stock slightly higher in stiffness than the stock of said first step about said first layer and substantially coextensively therewith,
   winding about said band in spiral fashion a length of cord reinforcement formed of a large plurality of glass fibers in gathered-together, substantially non-twisted array, said array being of flat to oval cross-sectional configuration with the major diameter of said oval lateral with respect to the cross-section of said array, said winding being controlled so that adjacent courses of said cord are in contiguous relationship,
   winding a second layer of vulcanizable stock about the so-formed assembly,
   cutting said assembly defined by the preceding steps into a plurality of individual annular elements,
   collapsing said mandrel,
   removing said elements from said collapsed mandrel, and
   subjecting said elements to vulcanizing temperature while restraining said elements substantially within a given constant volume.

2. The method as claimed in claim 1, wherein said thin band comprises a rubber stock containing therein a plurality of relatively short lengths of textile fibers.

3. The method as claimed in claim 1, wherein said thin band comprises a rubber stock containing therein a plurality of short lengths of glass fibers.

4. The method as claimed in claim 3, wherein said rubber stock additionally contains a plurality of short lengths of glass cords, each comprising gathered-together filaments of glass.

References Cited
UNITED STATES PATENTS

| | | | |
|---|---|---|---|
| 2,356,249 | 8/1944 | Kremer et al. | 156—142 |
| 2,995,176 | 8/1961 | Waugh | 156—142 |
| 3,418,864 | 12/1968 | Ross | 156—137 |

CARL D. QUARFORTH, Primary Examiner

B. H. HUNT, Assistant Examiner

U.S. Cl. X.R.

156—137, 171, 173, 193